United States Patent [19]

Hager et al.

[11] Patent Number: 5,990,212
[45] Date of Patent: Nov. 23, 1999

[54] COMPOSITIONS FOR RENDERING ABSORBENT MATERIALS WATER-REPELLENT AND OIL-REPELLENT

[75] Inventors: Rudolf Hager, Altoetting; Elke Eberharter, Burghausen, both of Germany

[73] Assignee: Wacker-Chemie GmbH, Munich, Germany

[21] Appl. No.: 08/888,933

[22] Filed: Jul. 7, 1997

[30] Foreign Application Priority Data

Aug. 26, 1996 [DE] Germany .............. 196 34 500

[51] Int. Cl.⁶ ...................................... C08K 3/34
[52] U.S. Cl. ................ 524/269; 106/2; 427/445; 524/261; 524/267; 524/268
[58] Field of Search ............ 106/287.12, 287.14, 106/287.16, 2; 524/261, 266, 267, 268, 269, 838, 860; 252/862; 427/455

[56] References Cited

U.S. PATENT DOCUMENTS

| | | |
|---|---|---|
| 4,125,673 | 11/1978 | Roth et al. ............... 428/447 |
| 4,648,904 | 3/1987 | Depasquale et al. . |
| 4,766,234 | 8/1988 | Wehowsky et al. . |
| 5,196,054 | 3/1993 | Schmuck et al. . |
| 5,314,533 | 5/1994 | Goebel et al. . |
| 5,399,191 | 3/1995 | Mayer et al. ............ 106/287.11 |
| 5,531,812 | 7/1996 | Montigny et al. . |

FOREIGN PATENT DOCUMENTS

| | | |
|---|---|---|
| 2639353 | 5/1990 | France . |
| 4309971 | 9/1994 | Germany . |

*Primary Examiner*—Robert Dawson
*Assistant Examiner*—D. Aylward
*Attorney, Agent, or Firm*—Brooks & Kushman P.C.

[57] ABSTRACT

The aqueous compositions for rendering absorbent materials oil-repellent and water-repellent consist essentially of (A) an organosilicon compound,
  (A1) a $C_1$–$C_{20}$-alkyl-$C_1$–$C_6$-alkoxysilane,
  (A2) an organopolysiloxane containing $C_1$–$C_6$-alkoxy groups and optionally groups selected from hydroxyl groups and $C_1$–$C_{30}$ hydrocarbon groups which optionally contain basic nitrogen, or mixtures of (A1) and (A2),
(B) an organofluorine compound consisting of fluorine and carbon atoms and optionally chlorine, hydrogen, oxygen sulfur, silicon, phosphorus and/ or nitrogen atoms, and containing CF bonds,
(C) a surfactant and
(D) water.

13 Claims, No Drawings

COMPOSITIONS FOR RENDERING ABSORBENT MATERIALS WATER-REPELLENT AND OIL-REPELLENT

BRIEF SUMMARY OF THE INVENTION

The present invention provides aqueous compositions for rendering absorbent materials oil-repellent and water-repellent, said compositions essentially consisting of organosilicon compounds, organofluorine compounds, surfactant and water, and a process for rendering absorbent materials water-repellent and oil-repellent

BACKGROUND OF THE INVENTION

Organosilicon compounds have been in use for a long time for the impregnation of mineral construction materials to render them water-repellent Organofluorine compounds are known for their oil-repellent properties. Although they also possess water-repellent properties, these are substantially less pronounced and their long-term stability is less than that of the organosilicon compounds conventionally used for rendering construction materials hydrophobic.

It was found advantageous to combine both classes of substances. U.S. Pat. No. 4,125,673 and U.S. Pat. No. 5,399,191 describe processes for rendering construction materials oil-repellent and water-repellent with such combination products comprising organosilicon and organofluorine compounds.

One disadvantage of the process described in U.S. Pat. No. 4,125,673 is that either ingredient requires an organic solvent as vehicle or, in the case of aqueous systems, only water-soluble silanes or siliconates can be used. In aqueous media, silanes have the disadvantage of only a very limited and short-lived solubility in water. By contrast, siliconates are highly alkaline and hence not without risk when handled, however, they are only of limited use because they are salts. U.S. Pat. No. 5,399,191 circumvents these difficulties by using special organosilicon compounds with ammonium functional groups, which are water-soluble or water-dispersible. However, these compositions have the disadvantage that they are expensive to manufacture and that the polysiloxanes with ammonium functional groups are incompatible with numerous organofluorine components or, due to polar interactions, interfere with the film formation of the organofluorine component FR-A-2 639 353 describes compositions consisting of emulsified organosilicon and organofluorine compounds. However, as well as the water-repellent organosilicon component and the oil-repellent organofluorine component, these compositions also contain an organic polymer dispersion for stabilizing the composition. The disadvantage of this component is that it imparts coating properties to the composition, thereby greatly reducing the permeability to water vapor.

DETAILED DESCRIPTION OF THE INVENTION

The object of the present invention was to provide aqueous compositions of organosilicon and organofluorine compounds which do not have the above disadvantages and which impart optimal water-, oil- and dirt-repellent properties to the absorbent materials.

The present invention provides aqueous compositions for rendering absorbent materials oil-repellent and water-repellent, said compositions consisting essentially of (A) an organosilicon compound
  (A1) a $C_1$–$C_{20}$-alkyl-$C_1$–$C_6$-alkoxysilane,
  (A2) an organopolysiloxane containing $C_1C_6$-alkoxy groups and optionally groups selected from hydroxyl groups and $C_1$–$C_{30}$ hydrocarbon groups which optionally contain basic nitrogen, or mixtures of (A1) and (A2),
(B) an organofluorine compound consisting of fluorine and carbon atoms and optionally chlorine, hydrogen, oxygen, sulfur, silicon, phosphorus and/ or nitrogen atoms, and containing CF bonds,
(C) a surfactant and
(D) water.

The organosilicon compounds (A) are in emulsified form, penetrate the absorbent material and form a hydrophobic zone. The organofluorine compounds (B) are in dispersed form and are capable of modifying the surface pores of the absorbent material so that substances containing oil and grease cannot penetrate. The diffusibility of the substrate is not appreciably impaired.

The combination of components (A) and (B) produces a synergy of the oleophobic and hydrophobic effects. The organosilicon compounds of component (A) penetrate the substrate and the organofluorine compounds of component (B) develop an optimal oleophobic action, even in low concentration. Despite these different effects of the individual components, the composition according to the invention is of homogeneous consistency and has a storage stability of months to years.

Suitable organosilicon compounds (A) are the organosilicon compounds in the form of aqueous emulsions which are described for example in U.S. Pat. No. 5,196,054, U.S. Pat. No. 4,648,904, U.S. Pat. No. 5,314,533 and DE-A43 09 971.

The $C_1$–$C_{20}$-alkyl-$C_1C_6$-alkoxysflanes (A1) preferably have 1 or 2 identical or different, optionally halogen-substituted, monovalent $C_1$–$C_{20}$-alkyl radicals with SiC bonds, and the other radicals are identical or different $C_1C_6$-alkoxy radicals.

Examples of the $C_1$–$C_{20}$ alkyl radicals are the methyl, ethyl, n-propyl, isopropyl, n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals like the 2,2,4-trimethylpentyl radical; nonyl radicals such as the n-nonyl radical; decyl radicals such as the n-decyl radical; dodecyl radicals such as the n-dodecyl radical; and cycloalkyl radicals such as the cyclopentyl, cyclohexyl, 4ethylcyclohexyl and cycloheptyl radicals, norbornyl radicals and methylcyclohexyl radicals.

Examples of the halogen-substituted $C_1$–$C_{20}$-alkyl radicals are alkyl radicals substituted by fluorine, chlorine, bromine and iodine atoms, such as the 3,3,3-trifluoro-n-propyl radical, the 2,2,2,2',2',2'-hexafluoroisopropyl radical and the heptafluoroisopropyl radical.

The unsubstituted $C_1$–$C_{12}$-alkyl radicals are preferred.

Examples of the $C_1C_6$-alkoxy radicals are the methoxy, ethoxy n-propoxy, isopropoxy, n-butoxy, isobutoxy, sec-butoxy and tert-butoxy radicals; pentoxy radicals such as the n-pentoxy radical; and hexyloxy radicals such as the n-hexyloxy radical. Methoxy and ethoxy radicals are preferred.

In addition to or instead of the alkylalkoxysilane (A1), the composition can comprise an organopolysiloxane (A2) containing alkoxy groups or a mixture of several organopolysiloxanes (A2). The organopolysiloxanes (A2) contain hydrocarbon groups and can additionally contain hydroxyl groups and/or amino groups, which facilitate bonding to the construction materials.

Suitable organopolysiloxanes are those consisting of units of the formula $$R_xSi(OR^1)_y(X)_zO_{\frac{4-x-y-z}{2}}, \quad (I)$$

in which
- R is an identical or different monovalent, optionally halogen-substituted $C_1$–$C_{20}$ hydrocarbon radical with SiC bonds,
- $R^1$ is an identical or different monovalent $C_1$–$C_6$-alkyl radical,
- X are hydroxyl groups or identical or different monovalent, optionally halogen-substituted $C_1$–$C_{30}$ hydrocarbon radicals with SiC bonds and containing basic nitrogen,
- x is 0, 1, 2 or 3, on average 0.8 to 1.8,
- y is 0,1, 2 or 3, on average 0.01 to 2.0, and
- z is 0, 1, 2 or 3, on average 0.0 to 0.5, with the proviso that the sum of x, y and z is at most 3.5.

The organopolysiloxane (A2) has a viscosity of 10 mm²/s to 50,000 mm²/s, preferably 20 mm²/s to 10,000 mm²/s, at 25° C.

If the organopolysiloxane (A2) is used without the alkoxysilane (A1) simultaneously, the organopolysiloxane (A2) has a viscosity of at most 5000 mm²/s, preferably at most 2000 mm²/s. The viscosity of the organopolysiloxane (A2) can be reduced to at most 5000 mm²/s, preferably at most 2000 mm²/s, by mixing with the alkoxysilane (A1).

Examples of R are the $C_1$–$C_{20}$ hydrocarbon radicals listed for the organoalkoxysilanes. The unsubstituted $C_1$–$C_{12}$-alkyl radicals and the phenyl radical are preferred.

Although not shown in the formula above, some of the radicals R can be replaced with hydrogen atoms bonded directly to silicon atoms, although this is not preferred.

Examples of the radicals $R^1$ are the methyl, ethyl, n-propyl, isopropyl, n-butyl, sec-butyl and tert-butyl radicals; pentyl radicals such as the n-pentyl radical; and hexyl radicals such as the n-hexyl radical, ethyl radicals being preferred.

The $C_1$–$C_{30}$ hydrocarbon radical X containing basic nitrogen is a radical of the formula $$R^2{}_2NR^3- \quad (II),$$

in which
- $R^2$ is identical or different and is hydrogen or a monovalent, optionally substituted $C_1$–$C_{10}$ hydrocarbon radical or $C_1$–$C_{10}$ aminohydrocarbon radical, and
- $R^3$ is a divalent $C_1$–$C_{15}$ hydrocarbon radical.

Examples of the radical $R^2$ are the examples given for the radical R of hydrocarbon radicals and hydrocarbon radicals substituted by amino groups, such as aminoalkyl radicals, the aminoethyl radical being preferred.

Preferably at least one hydrogen atom is bonded to each nitrogen atom in the radicals of formula (II).

The radical $R^3$ is preferably a divalent hydrocarbon radical having 1 to 10 carbon atoms, particularly preferably 1 to 4 carbon atoms, and is especially the n-propylene radical.

Examples of the radical $R^3$ are the methylene, ethylene, propylene, butylene, cyclohexylene, octadecylene, phenylene and butenylene radicals.

Preferred examples of the radicals X are
$H_2N(CH_2)_3-$,
$H_2N(CH_2)_2NH(CH_2)_2-$,
$H_2N(CH_2)_2NH(CH_2)_3-$,
$H_2N(CH_2)_2-$,
$H_3CNH(CH_2)_3-$,
$C_2H_5NH(CH_2)_3-$,
$H_3CNH(CH_2)_2-$,
$C_2H_5NH(CH_2)_2-$,
$H_2N(CH_2)_4-$,
$H_2N(CH_2)_5-$,
$H(NHCH_2CH_2)_3-$,
$C_4H_9NH(CH_2)_2NH(CH_2)_2-$,
cyclo-$C_6H_{11}NH(CH_2)_2-$,
cyclo-$C_6H_{11}NH(CH_2)_2-$,
$(CH_3)_2N(CH_2)_3-$,
$(CH_3)_2N(CH_2)_2-$,
$(C_2H_5)_2N(CH_2)_3-$ and
$(C_2H_5)_2N(CH_2)_2-$.

The examples of alkyl radicals $R^1$ are also fully applicable to the radical $R^3$.

The radicals R, $R^1$ and X which are not halogen-substituted are preferred.

x has an average value of 0.9 to 1.1. y has an average value of 0.4 to 1.2. z has an average value of 0.0 to 0.2.

Examples of organopolysiloxanes (A2) which have no hydroxyl groups or aminoalkylene radicals are those obtainable by reacting methyltrichloro- silane and optionally a $C_1$–$C_8$-allkyltrichlorosilane or phenyltrichlorosilane with ethanol in water, such as the organopolysiloxanes of the empirical formulae $CH_3Si(OC_2H_5)_{0.8}O_{1.1}$, $C_6H_5Si(OC_2H_5)_{0.72}O_{1.14}$ or $(CH_3)_{0.7}(isooctyl)_{0.3}Si(OC_2H_5)_{1.3}O_{0.85}$.

The amine number of the organopolysiloxane (A2) comprising $C_1$–$C_{30}$ hydrocarbon radicals X containing basic nitrogen is preferably at least 0.1, especially at least 0.2, and preferably at most 8, especially at most 4. The amine number denotes the number of ml of 1 N HCl required to neutralize 1 g of organopolysiloxane (A2).

Organopolysiloxanes (A2) comprising $C_1$–$C_{30}$ hydrocarbon radicals X containing basic nitrogen can be prepared, for example by equilibrating or condensing amino-functional silanes with organopolysiloxanes which contain alkoxy groups and/or hydroxyl groups and are devoid of basic nitrogen.

The organofluorine compounds (B) are preferably polymeric compounds.

Examples of organofluorine compounds (B) which can be used are any compounds which have been used for rendering organic substances, such as organic fibers, and inorganic substances oil-repellent and dirt-repellent Examples of such compounds are polymers prepared from at least partially fluorinated monomers, such as polytetrafluoroethylene, copolymers of tetrafluoroethylene and hexafluoropropylene, polytrifluorochloroethylene, polyvinyl fluoride, polyvinylidene fluoride, polytrifluorochloroethylene, trifluorochloroethylene and other monomers like vinylidene fluoride, vinyl chloride, vinyl acetate, methyl methacrylate or styrene, fluorinated acrylic resins such as polymers of 1,1-dihydroperfluorobutyl acrylate and copolymers of fluorine-free and fluorinated acrylic and methacrylic acid esters, as well as fluorinated polyurethanes such as those described for example in U.S. Pat. No. 4,766,234.

Preferred fluorinated acrylic and methacrylic acid esters have the formula

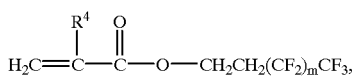

(III)

in which

R⁴ is a hydrogen atom or a methyl group, and m is an integer with a value of 1 to 15.

Preferably, the organofluorine compounds (B) are fluorinated polyacrylates and polyurethanes. It is possible to use one type of organofluorine compound or a mixture of several types of organofluorine compounds.

At least 10% by weight, preferably at least 20% by weight of the organofluorine compounds (B) consists of fluorine in CF bonds.

In the aqueous compositions according to the invention, the organofluorine compounds (B) must be dispersed in water. The aqueous composition according to the invention can optionally contain up to 15% by weight, especially up to 10% by weight, of organic solvents (E) for improving the dispersibility of the organofluorine compounds (B).

Examples of organic solvents (E) for improving the dispersibility of the organofluorine compounds (B) are ethylene glycol, isopropanol, acetone, methyl ethyl ketone, butyl acetate, butyl glycol acetate and N-methylpyrrolidone.

The surfactant (C) serves as an emulsifier for the organosilicon compounds (A) and as a dispersant for the organofluorine compounds (B). The surfactants conventionally used for emulsions and dispersions for the protection of buildings can be used as the surfactant (C).

The following are suitable as anionic surfactants (C):

1. Alkylsulfates, especially those with a chain length of 8 to 18 C atoms, alkyl and alkaryl ether sulfates having 8 to 18 C atoms in the hydrophobic radical and 1 to 40 ethylene oxide (EO) or propylene oxide (PO) units.
2. Sulfonates, especially alkylsulfonates having 8 to 18 C atoms, alkylarylsulfonates having 8 to 18 C atoms, taurides, esters and half-esters of sulfosuccinic acid with monohydric alcohols or alkylphenols having 4 to 15 C atoms, it optionally being possible for these alcohols or alkylphenols also to be ethoxylated with 1 to 40 EO units.
3. Alkali metal and ammonium salts of carboxylic acids having 8 to 20 C atoms in the alkyl, aryl, alkaryl or aralkyl radical.
4. Phosphoric acid partial esters and their alkali metal and ammonium salts, especially alkyl and alkaryl phosphates having 8 to 20 C atoms in the organic radical, alkyl or alkaryl ether phosphates having 8 to 20 C atoms in the alkyl or alkaryl radical and 1 to 40 EO units. The following are suitable as non-ionic surfactants (C):
5. Polyvinyl alcohol which also comprises 5% to 50%, preferably 8% to 20%, of vinyl acetate units, with a degree of polymerization of 500 to 3000.
6. Alkyl polyglycol ethers, preferably those having 8 to 40 EO units and alkyl radicals having 8 to 20 C atoms.
7. Alkylaryl polyglycol ethers, preferably those having 8 to 40 EO units and 8 to 20 C atoms in the alkyl and aryl radicals.
8. Ethylene oxide/propylene oxide (EO/PO) block copolymers, preferably those having 8 to 40 EO or PO units.
9. Addition products of alkylamines with ethylene oxide or propylene oxide, the alkyl radicals having 8 to 22 C atoms.
10. Fatty acids having 6 to 24 C atoms.
11. Alkylpolyglycosides of the formula R*—O—Z₀, in which R* is a linear or branched, saturated or unsaturated alkyl radical having on average 8–24 C atoms and Z₀ is an oligoglycoside radical in which on average o=1–10 hexose or pentose units or mixtures thereof.
12. Natural substances and derivatives thereof, such as lecithin, lanolin, saponins, cellulose, and cellulose alkyl ethers and carboxyalkyl celluloses in which the alkyl groups each have up to 4 carbon atoms.
13. Linear organo(poly)siloxanes containing polar groups, especially those with alkoxy groups having up to 24 C atoms and/or up to 40 EO and/or PO groups.

The following are suitable as cationic surfactants (C):

14. Salts of primary, secondary and tertiary fatty amines having 8 to 24 C atoms with acetic acid, sulfuric acid, hydrochloric acid and phosphoric acids.
15. Quaternary alkylammonium and alkylbenzeneammonium salts, particularly those in which the alkyl group has 6 to 24 C atoms, especially the halides, sulfates, phosphates and acetates.
16. Alkylpyridinium, alkylimidazolinium and alkyloxazolinium salts, particularly those in which the alkyl chain has up to 18 C atoms, especialy the halides, sulfates, phosphates and acetates. The following are suitable as ampholytic surfactants (C):
17. Long-chain substituted amino acids such as N-alkyl-di (aminoethyl)-glycine or N-alkyl-2-aminopropionic acid salts.
18. Betaines such as N-(3-acylamidopropyl)-N,N-dimethylammonium salts with a $C_8$–$C_{18}$-acyl radical and alkylimidazolium betaines.

Preferred surfactants (C) are non-ionic emulsifiers, especially the addition products of alkylamines with ethylene oxide or propylene oxide listed under 9. above, the alkylpolyglycosides listed under 11. above and the polyvinyl alcohol listed under 5. above. Preferred polyvinyl alcohols also comprise 5% to 20%, especially 10% to 15%, of vinyl acetate units and preferably have a degree of polymerization of 500 to 3000, especially of 1200 to 2000.

The total amount of components (A) and (B) in the aqueous compositions is preferably 1% to 70% by weight, especially 2% to 50% by weight The proportion of surfactant (C) is preferably at least 0.1 part by weight, especially at least 2 parts by weight, and at most 30 parts by weight, especially at most 10 parts by weight, based on 100 parts by weight of the sum of components (A) and (B).

The total amount of component (A) in the aqueous composition according to the invention is at least 50 parts by weight, especially at least 70 parts by weight, and at most 99 parts by weight, especially at most 95 parts by weight, based on 100 parts by weight of the sum of components (A) and (B).

The total amount of component (B) in the aqueous composition according to the invention is at least 1 part by weight, especially at least 5 parts by weight, and at most 50 parts by weight, especially at most 30 parts by weight, based on 100 parts by weight of the sum of components (A) and (B).

The composition according to the invention contains at least 50 parts by weight, especially at least 100 parts by weight, and at most 10,000 parts by weight, especially at most 5000 parts by weight, of water (D), based on 100 parts by weight of the sum of components (A) and (B).

In addition to components (A) and (B), the compositions according to the invention can also contain additives (F) such as preservatives, dispersants and buffer substances. The compositions according to the invention contain a total of at most 10 parts by weight, preferably at most 5 parts by weight, of additives (F), based on 100 parts by weight of the sum of components (A) and The pH of the compositions according to the invention is 4 to 9 and preferably 5 to 8.

The compositions according to the invention are prepared by simply stirring together an emulsion of component (A) and a dispersion of component (B) and optionally water, in any order. However, they can also be prepared by a procedure in which the organofluorine compounds (B) or a solution of the compounds (B) are emulsified into an emulsion of component (A) by means of shear forces. The reverse procedure is also possible by analogy, i.e. the organosilicon compounds (A) are emulsified into an aqueous dispersion of the organofluorine compounds (B). Finally, another possibility is to mix the organosilicon compounds (A) and the organofluorine compounds (B) and optionally organic solvents (E) and to disperse the mixture in water (D) in a conventional emulsification process.

The invention further provides a process for rendering absorbent substrates, such as mineral construction materials or wood, water-repellent and oil-repellent, wherein the aqueous compositions are applied to the absorbent substrates. Absorbency is understood here as meaning that the material in question is capable of absorbing at least 0.1% of its weight of liquid via capillary suction. Examples of absorbent materials are mineral construction materials such as concrete, clay, brick, ceramic tiles, fibrous cement tiles, sandy limestones, sandstones, limestones, marble, travertines and granite, and non-mineral construction materials, especially wood and cellulose-containing materials.

The aqueous compositions according to the invention can be applied in any desired manner, for example by spraying, pouring, coating, rolling or dipping. Outstanding water and oil repellency with long-term stability can be achieved very easily at low material cost by using the aqueous compositions according to the invention. On the substrates treated with the aqueous compositions according to the invention, the capillary absorption of water and pollutants dissolved in water, as well as oil and oleophilic substances, is reduced or suppressed without blocking the substrates' pores and capillaries, so the substrates retain their ability to breathe.

As the compositions according to the invention contain water as the vehicle, they are substantially easier and safer to handle than comparable products based on organic solvents.

The following Examples will illustrate the invention in greater detail. All parts and percentages are by weight. The Examples are carried out at atmospheric pressure i.e. at about 1000 hPa, and at room temperature, i.e. at about 23° C. The substrates treated with the compositions according to the invention were stored for at least 28 days in a normal climate (23° C./50% relative humidity) before use.

Preparation of the Compositions According to the Invention

The compositions according to the invention used in the following Examples are prepared by simply mixing the emulsions of components (A) and dispersions of components (B) without the use of shear forces. The following starting materials are used:

Component (A)

A 1) 40% emulsion of n-octyltriethoxysilane (ENVIROSEAL® 40 from Thoro System Products, Mol, Belgium).

A 2) 70% emulsion of isooctyltriethoxysilane and amino-functional polysiloxane: 160 g of a condensation product of α,ω-dihydroxypolydimethylsiloxane and N-(2-aminoethyl)-3-aminopropyltrimethoxysilane, which has a viscosity of ca. 1.5 mm$^2$/s at 25° C. and an amine number of 0.6, are emulsified in a high-speed stator-rotor stirrer with a mixture of 15 g of a reaction product of stearylamine and ethylene oxide (Genamin® 200 from Hoechst AG, Frankfurt) and 30 g of a butyl alcohol glycoside (Glukopon® 225 from Henkel KGaA, Duisseldorf) in 95 g of water. 540 g of isooctyltriethoxysilane are then mixed into this emulsion and 160 g of water are added.

A 3) 50% emulsion of isooctyltriethoxysilane and oligomeric methylalkoxysiloxane: A mixture of 400 g of isooctyltriethoxysilane and 100 g of methylalkoxysiloxane of the empirical formula $CH_3Si(OC_2H_5)_{0.8}O_{1.1}$, with an average molecular weight of ca. 650 g/mol and a viscosity of ca. 20 mm$^2$/s, is emulsified in a high-speed stator-rotor stirrer with a solution of 25 g of isotridecyl alcohol (16) polyglycol ether (Arlypon® IT 16 from Chemische Fabrik Grunau GmbH, Illertissen) in 475 g of water.

Component (B)

B 1) 20% dispersion of a polyurethane containing perfluoroalkyl groups (Nuva® LB from Hoechst AG, Frankfurt).

B 2) 25% formulation of a fluorinated acrylic resin in water (Foraperle® 321 from Elf Atochem Deutschland GmbH).

APPLICATION EXAMPLE 1

Ca. 300 g/m$^2$ of the compositions indicated in Table 1 are coated onto unglazed terracotta tiles. After a drying time of 7 days at room temperature, the water and oil repellency are tested. This is done by applying 5 drops of water and 5 drops of soya oil (a volume of ca. 0.2 ml in each case) to each tile. 15 minutes after application, the water-repellent action is characterized by determining the angle of contact of the water drops—if they have not yet been absorbed. To characterize the oil-repellent action, the drops are successively wiped off (after 1 minute, 1 h, 8 h, 24 h and 72 h) and the remaining spot is assessed (1=no detectable spot, 2=small spot, 3=medium spot, 4=large spot, 5=oil drops already absorbed before test).

TABLE 1

| Product no. | Composition of impregnating agent (parts by weight) | Water repellency (angle of contact after 15 min) | oil repellency (spotting) | | | | |
|---|---|---|---|---|---|---|---|
| | | | 1 minute | 1 h | 8 h | 24 h | 72 h |
| Z 1 | 0.13 A 1 + 0.87 H$_2$O | 40° | 2 | 3 | 4 | 5 | 5 |
| Z 2 | 0.07 A 2 + 0.93 H$_2$O | 120° | 3 | 3–4 | 4–5 | 5 | 5 |
| Z 3 | 0.10 A 3 + 0.9 H$_2$O | 120° | 2 | 3 | 4 | 5 | 5 |
| Z 4 | 0.06 B 1 + 0.94 H$_2$O | 100° | 1 | 1–2 | 2 | 2 | 3 |
| Z 5 | 0.05 B 2 + 0.95 H$_2$O | 120° | 1 | 1 | 1 | 1 | 1 |
| Z 6 | 0.10 A 1 + 0.06 B 1 + 0.84 H$_2$O | 100° | 1 | 1 | 1 | 1 | 1 |
| Z 7 | 0.10 A 1 + 0.05 B 2 + 0.95 H$_2$O | 120° | 1 | 1 | 1 | 1 | 1 |

TABLE 1-continued

| Product no. | Composition of impregnating agent (parts by weight) | Water repellency (angle of contact after 15 min) | oil repellency (spotting) | | | | |
|---|---|---|---|---|---|---|---|
| | | | 1 minute | 1 h | 8 h | 24 h | 72 h |
| Z 8 | 0.08 A 2 + 0.06 B 1 + 0.86 $H_2O$ | 130° | 1 | 1 | 1 | 1 | 1 |
| Z 9 | 0.04 A 2 + 0.03 B 1 + 0.93 $H_2O$ | 120° | 1 | 1 | 1 | 1–2 | 2 |
| Z 10 | 0.14 A 3 + 0.05 B 1 + 0.81 $H_2O$ | 135° | 1 | 1 | 1 | 1 | 1 |
| untreated | | absorbed | 4 | 5 | 5 | 5 | 5 |

Z 6–Z 10: compositions according to the invention
Z 1–Z 5: Comparative Examples

Conclusions

The compositions Z 6 to Z 10 according to the invention give good oil repellency. A comparison of Z 5 and Z 7 shows that the good oil-repellent action of the organofluorine component B 2 is in no way impaired by the organosilicon component A 1. In the case of B 1, it is even possible to detect a positive influence of the organosilicon compounds on the oil-repellent properties (cf. Z 4, Z 6 and Z 8–Z 10).

APPLICATION EXAMPLE 2

Sandy limestone cubes of edge length 5 cm are dipped for 5 minutes in the impregnating agents Z 1–Z 10 indicated in Table 1 (Example 1) (5 cm of liquid above the cubes). The resulting uptake of impregnating agent is ca. 400 g/m². After a drying time of 7 days, the water and oil repellency are tested as in Example 1. The capillary water uptake (in % by weight) is additionally determined by dipping the test samples in water for 24 hours (5 cm of water above the cubes).

TABLE 2

| Impregnating agent | Water repellency | | Oil repellency | | | | |
|---|---|---|---|---|---|---|---|
| | angle of contact after 30 min | water uptake after dipping for 24 h | 1 min | 1 h | 8 h | 24 h | 72 h |
| Z1 | 70° | 2.5% | 4 | 5 | 5 | 5 | 5 |
| Z2 | 140° | 1.7% | 4 | 5 | 5 | 5 | 5 |
| Z3 | 135° | 1.5% | 4 | 5 | 5 | 5 | 5 |
| Z4 | 105° | 11.4% | 1 | 1–2 | 2 | 2–3 | 3 |
| Z5 | 125° | 11.8% | 1 | 1 | 1–2 | 2 | 2–3 |
| Z6 | 110° | 2.3% | 1 | 1 | 1 | 1–2 | 2 |
| Z7 | 120° | 2.0% | 1 | 1 | 1 | 1–2 | 2 |
| Z8 | 140° | 1.3% | 1 | 1 | 1 | 1–2 | 2 |
| Z9 | 140° | 2.1% | 1 | 1–2 | 2 | 2–3 | 3 |
| Z10 | 145° | 0.9% | 1 | 1 | 1–2 | 2 | 2–3 |
| untreated | absorbed | 13.0% | 5 | 5 | 5 | 5 | 5 |

Conclusions

As in Example 1, the fluorine components B 1 and B 2 (Z 4 and Z 5) and the compositions Z 6–Z 10 according to the invention, prepared therefrom, afford good oil repellency for a number of hours. After 72 hours, however, even these show at least a small spot because the substrate is very porous. A comparison of the compositions Z 4 and Z 5, containing only the fluorine component, with the compositions Z 6 - Z 10 according to the invention shows that although the fluorine components reduce the wetting of the surface by water, an acceptable hydrophobicity, i.e. reduction in water uptake, is achieved only by the organosilicon components A 1–A 3 in the compositions according to the invention.

APPLICATION EXAMPLE 3

Ca. 50 g/m² of the impregnating agents Z 8 and Z 10 (Table 1, Example 1) are coated onto granite test samples. After a drying time of 7 days, drops of water and soya oil are applied to the treated surfaces and to untreated granite (in each case ca. 0.2 ml per drop). Whereas the drops flow apart within seconds on the untreated stone, they remain unchanged on the impregnated surfaces (angle of contact after 1 h: water>130°, oil>100°).

APPLICATION EXAMPLE 4

2 unglazed terracotta tiles are coated on one half with the compositions Z 2 and Z 8 from Example 1. After a drying time of 1 week, a felt-tip pen (Edding® 3000) is used to scrawl on both the untreated and treated parts of the tiles. After 2 hours the surfaces are cleaned with ethanol. The felt-tip scrawl can only be removed without residue from the surface treated with Z 8, the ink being only partially removable from the untreated surface and the surface treated with Z 2. This Example demonstrates the suitability of the compositions according to the invention for providing resistance to graffiti.

What is claimed is:

1. An aqueous composition for rendering absorbent materials oil-repellent and water-repellent, said composition being an aqueous emulsion consisting essentially of (A) as an organosilicon component,
(A1) one or more $C_1$–$C_{20}$-alkyl-$C_1$–$C_6$-alkoxysilanes,
(A2) one or more organopolysiloxanes containing $C_1$–$C_6$-alkoxy groups and optionally groups selected from hydroxyl groups and $C_1$–$C_{30}$ hydrocarbon groups, and which optionally contain basic nitrogen, or,
(A3) mixtures of (A1) and (A2),
(B) one or more organofluorine compounds consisting of fluorine and carbon atoms and optionally chlorine, hydrogen, oxygen, sulfur, silicon, phosphorus and/or nitrogen atoms, and containing CF bonds,
(C) a surfactant, and
(D) water.

2. An aqueous composition as claimed in claim 1 wherein the $C_1$–$C_{20}$-alkyl-$C_1$–$C_6$-alkoxysilanes (A1) have 1 or 2 identical or different, optionally halogen-substituted, monovalent $C_1$–$C_{20}$-alkyl radicals with SiC bonds, and the remaining radicals are identical or different $C_1$–$C_6$-alkoxy radicals.

3. An aqueous composition as claimed in claim 1, wherein the organopolysiloxanes comprise units of the formula

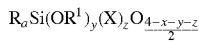

in which

R is an identical or different monovalent, optionally halogen-substituted $C_1$–$C_{20}$ hydrocarbon radicals with SiC bonds, $R^1$ is an identical or different monovalent $C_1$–$C_6$-alkyl radical, X is a hydroxyl group or identical or different monovalent, optionally halogen-substituted $C_1$–$C_{30}$ hydrocarbon radical with SiC bonds and containing basic nitrogen, a is 1, 2 or 3, on average 0.8 to 1.8, y is 0, 1, 2 or 3, on average 0.01 to 2.0, and z is 0, 1, 2 or 3, on average 0.0 to 0.5, with the proviso that the sum of x, y and z is most 3.5.

4. An aqueous composition as claimed in claim 1, wherein the organopolysiloxane (A2) has a viscosity of 10 mm$^2$/s to 50,000 mm$^2$/s.

5. An aqueous composition as claimed in claim 1, wherein the organofluorine compound is a polymer prepared from monomers at least one of which is fluorinated.

6. An aqueous composition as claimed in claim 1, wherein at least 10% by weight of the organofluorine compounds (B) consists of fluorine in CF bonds.

7. An aqueous composition as claimed in claim 1, wherein fluorinated polyacrylates and polyurethanes are used as the organofluorine compounds (B).

8. An aqueous composition as claimed in claim 1, wherein the total amount of component (A) is at least 50 parts by weight and at most 99 parts by weight, based on 100 parts by weight of the sum of components (A) and (B).

9. A process for rendering absorbent substrates water-repellent and oil-repellent, wherein the aqueous compositions as claimed in claim 1 are applied to the absorbent substrates.

10. The composition of claim 1, wherein said organosilicon component contains n-octyltriethoxysilane.

11. The composition of claim 1, wherein said organosilicon component contains isooctyltriethoxysilane and an amino-functional polysiloxane prepared by reacting N-(2-aminoethyl)-3-aminopropyl-trimethoxysilane with an α,ω-dihydroxypolydimethylsiloxane.

12. The composition of claim 1, wherein said organosilicon component contains a mixture of isooctyltriethoxysilane and a methylalkoxysilane.

13. An aqueous composition for rendering absorbent materials oil-repellent and water-repellent, said composition being an aqueous emulsion consisting essentially of (A) as an organosilicon component,
(A1) one or more $C_1$–$C_{20}$-alkyl-$C_1$–$C_6$-alkoxysilanes,
(A2) one or more organopolysiloxanes containing $C_1$–$C_6$-alkoxy groups and optionally groups selected from hydroxyl groups and $C_1$–$C_{30}$ hydrocarbon groups, and which optionally contain basic nitrogen, or
(A3) mixtures of (A1) and (A2), (B) one or more organofluorine compounds consisting of fluorine and carbon atoms and optionally chlorine, hydrogen, oxygen, sulfur, silicon, phosphorus and/or nitrogen atoms, and containing CF bonds, (C) a surfactant, and (D) water, wherein said composition is free of organosilicon compounds with ammonium functional groups.

* * * * *

UNITED STATES PATENT AND TRADEMARK OFFICE
CERTIFICATE OF CORRECTION

PATENT NO. : 5,990,212
DATED : November 23, 1999
INVENTOR(S) : Rudolf Hager et al.

It is certified that error appears in the above-identified patent and that said Letters Patent is hereby corrected as shown below:

Column 11, Line 26, Claim 6 after "An" and before "aqueous" delete ".".

Signed and Sealed this

Twentieth Day of June, 2000

Attest:

Q. TODD DICKINSON

Attesting Officer

Director of Patents and Trademarks